MAGNETIC-CORE DECODING CIRCUIT

Filed July 6, 1961 3 Sheets-Sheet 1

DAVID NITZAN
INVENTOR.

BY Lyon & Lyon
ATTORNEYS.

MAGNETIC-CORE DECODING CIRCUIT

DAVID NITZAN
INVENTOR.

BY Lyon & Lyon
ATTORNEYS.

DAVID NITZAN
INVENTOR.

BY Lyon & Lyon

ATTORNEYS.

3,081,453
Patented Mar. 12, 1963

3,081,453
MAGNETIC-CORE DECODING CIRCUIT

David Nitzan, Palo Alto, Calif., assignor to AMP Incorporated, Harrisburg, Pa., a corporation of New Jersey Filed July 6, 1961, Ser. No. 122,219
10 Claims. (Cl. 340—347)

This invention relates to circuits employed for decoding binary information and, more particularly, to improvements therein.

An object of this invention is the provision of a novel, magnetic-core circuit for decoding binary information.

Another object of this invention is the provision of a simple arrangement of magnetic cores and their windings for decoding binary information.

Still another object of this invention is the provision of a useful binary information-decoding circuit which employs only magnetic cores and wires in a unique configuration.

These and other objects of the invention are achieved by providing an arrangement of magnetic cores in successive groups wherein the number of cores in each group is effectively double the number of cores in the preceding group. The number of these groups of cores which are required is determined by the number of binary bits in a binary number to be decoded. These magnetic cores are interconnected in a manner so that successive application of the binary bits in a number successively transfers the state of remanence in the first core through all the core groups until the last group, where an output is derived from one of the cores in that last group. The sequence of the transference of the state of remanence of the first core through the various core groups to the last core group is determined in accordance with the binary bits in a number which are applied in sequence to the circuitry interconnecting the cores. Thus, the occurrence of an output at one of potentially many outputs effectively decodes the input binary information.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
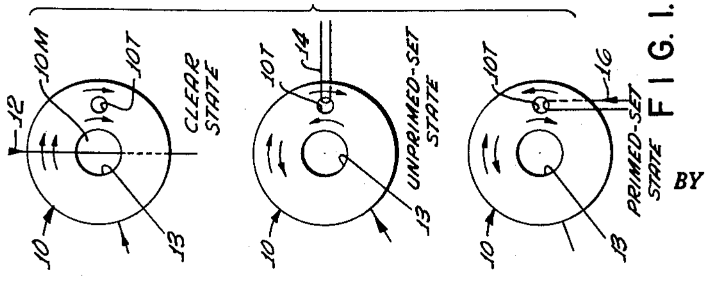
FIGURE 1 is a schematic drawing shown to assist in an understanding of this invention.

Reference is now made to FIGURE 1, which shows a magnetic core of the multiaperture type, suitable for use with this invention, in the various flux states to which a core is driven in the course of a decoding operation. A core 10, of the type preferred for utilization herein, is preferably made of a ferrite material, which has two states of magnetic remanence, and preferably substantially rectangular hysteresis characteristics. The core 10 has a main aperture 10M and a terminal, or transmit, aperture 10T. The main aperture is the central, large aperture of the core, and the terminal aperture is a much smaller aperture in the ring of the core material adjacent the main aperture. The arrows in FIGURE 1 represent the direction of the magnetic flux in the ferrite ring. A magnetic core 10 can be driven to its clear state of magnetic remanence by a current applied to the winding 12. This winding, which is called the clear winding, is inductively coupled to the core 10 by passing through its main aperture. The clear state of magnetic remanence is represented by the arrows pointing in a clockwise direction.

Another winding 14 is inductively coupled to the core by passing through its terminal aperture 10T. It should be noted at this time that although the windings are shown in the drawings as being of the single-turn variety, this is not necessarily the situation, since, as those skilled in the art well know, many turns of the winding may be required on a core in accordance with the current-supply capabilities of the driving source and the magnetic properties of the magnetic material of which the core is made. Current applied to a winding 13 can cause a reversal of the direction of magnetic flux in the ferrite material closest to the main aperture, sometimes called the inner leg, which can be considered as the ring of material between the main aperture and the transmit aperture. The core, when its flux has this orientation, is designated as being in its unprimed set state. The winding 13 may be an input winding or a transfer winding—that is, one which is coupled to a preceding core from which the drive current is being received. An output, or transfer, winding 14 is coupled to the core 10 by passing through its transmit aperture. This winding 14 may be coupled to a succeeding core for driving it in response to flux changes occurring in the preceding core.

In accordance with the operation of this invention, a core, which is driven to its unprimed set state, is subsequently driven to its primed set state. This may be achieved by applying current to a winding 16, which is inductively coupled to the transmit aperture 10T. The current in the prime winding 16 causes a reversal of the flux about the transmit aperture, as may be seen by the direction of arrows adjacent this aperture. The technique of priming a core after it has been set is well known. It should be borne in mind that the proper prime current drive which is applied to a core in its clear state does not materially affect the flux in that core. The core must be in the unprimed-set state for the prime drive to effectuate flux reversal about the terminal aperture.

Figure 2:
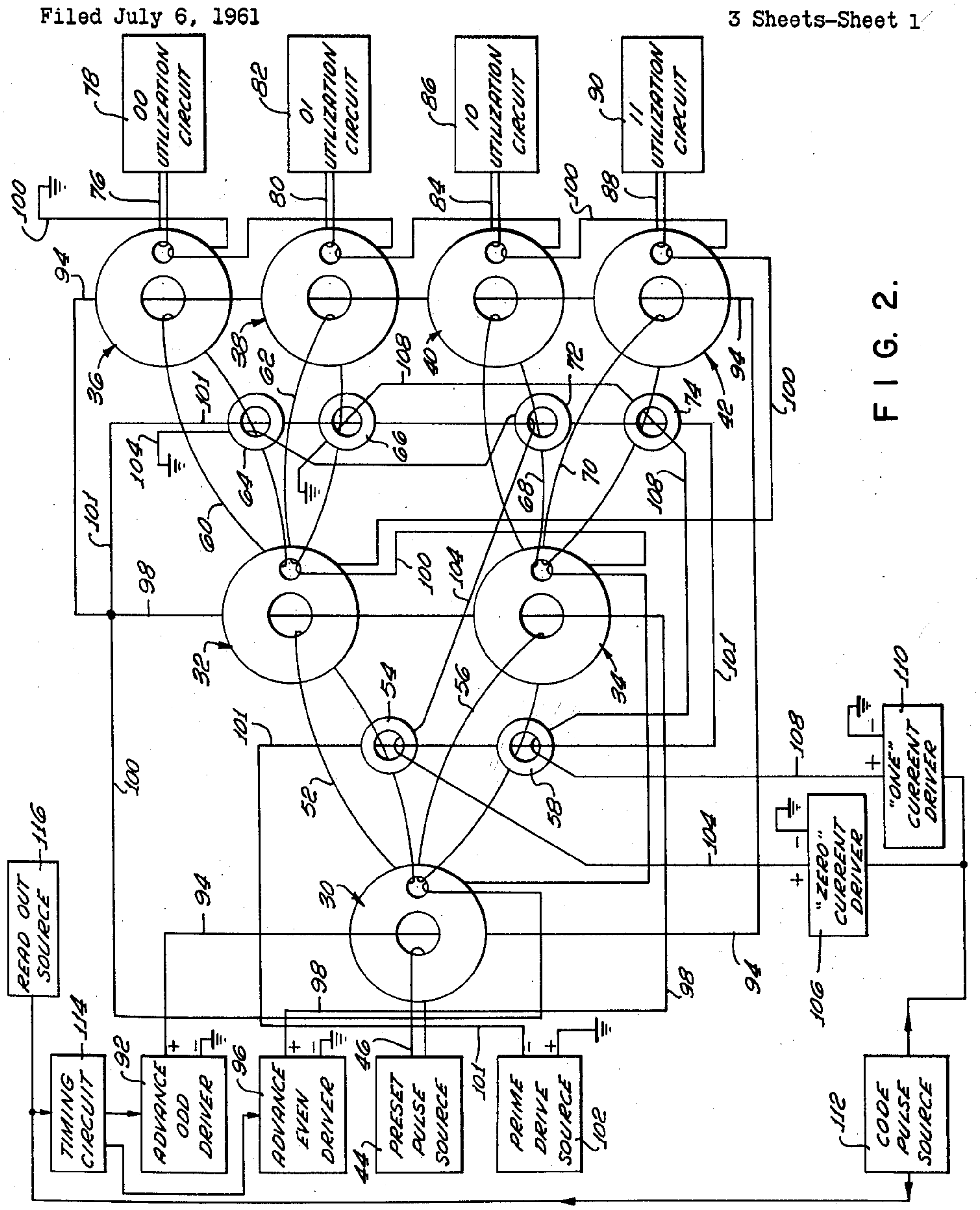
FIGURE 2 is a circuit diagram of an embodiment of this invention.

Reference is now made to FIGURE 2 of the drawings, which is a schematic diagram of an embodiment of the invention. The arrangement shown is exemplary of a binary decoding tree capable of indicating by an output on one of four output windings 76, 80, 84, 88 what two-binary-bit code pattern was applied to the decoding tree.

For the task of decoding two binary bits, three groups of cores are provided, a first group having one core 30, a second group having two cores 32, 34, and the third group having four cores 36, 38, 40, and 42. It is thus seen that the number of cores in each group is twice the number of cores in the preceding group. Before commencing a decoding operation, the core 30 is driven to its set state by any suitable arrangement. As shown in the drawings, a preferred arrangement is to apply a current pulse from a preset-pulse source 44 to an input winding 46 coupled to the core 30 through its main aperture. This drives the core 30 to its unprimed-set state. Core 30 is coupled to core 32 by a transfer winding 52, which is wound on core 30 passing through its transmit aperture and is wound on core 32 passing through its main aperture. The winding 52 is also coupled to another core 54, which can be designated as a transfer-control core. The core 54 and other transfer-control cores to be described differ from the cores to which they are coupled by the common transfer winding by having a lower coercive force than these other cores, but the same flux capacity as one leg around a transmit aperture of the other cores, so that upon the occasion of a flux transfer between the other cores via a current flowing in the transfer winding, the transfer-control core, if permitted, will be driven first, and thus will absorb enough of the flux to prevent any of the other cores from being driven. This will become more clear as this explanation progresses.

Core 30 is coupled to the core 34 by a transfer winding 56, on which there is also coupled a transfer-control core 58. The transfer winding 56 is wound on core 30 passing through its transmit aperture, is wound on core 34 passing through its main aperture, and is wound on core 58 passing through its aperture. Core 32 is coupled to cores 36 and 38 by way of two transfer windings 60 and 62, respectively. These transfer windings are both inductively coupled to core 32 by being wound through its transmit aperture and are respectively inductively coupled to the cores 36 and 38 by being wound through their main apertures. Transfer-control cores 64, 66 are respectively coupled to the transfer windings 60 and 62.

The magnetic core 34 is coupled to the cores 40 and 42 through transfer windings 68 and 70. These transfer windings are inductively coupled to the core 34 by being wound through its transmit aperture and thereafter are inductively coupled to the respective cores 40, 42, by being wound through the main apertures. Transfer-control cores 72 and 74 are respectively inductively coupled through the windings 68 and 70.

Core 36 has an output winding 76, which is coupled to a utilization circuit 78. Core 38 has an output winding 80, which is coupled to a utilization circuit 82. Core 40 has an output winding 84, which is coupled to the utilization circuit 86. Core 42 has an output winding 88, which is coupled to the utilization circuit 90. All the output windings 76, 80, 84, 88, are inductively coupled to their associated cores by being wound through their transmit apertures.

A clear drive is applied to cores 30, 42, 40, 38, and 36 by the application of a current from an advance-odd-driver current source 92 to a first clear winding 94, which is inductively coupled to the enumerated cores by passing through their main apertures. An advance-even-driver current source 96 applies current to a second clear winding 98 for driving to their clear state of magnetic remanence the cores 34 and 32. The second clear winding 98 is inductively coupled to these cores by passing through their main apertures. The ends of the winding 94 and 98 are joined together to a winding 100, which serves as hold and clear, as well as prime winding. This winding is inductively coupled to all the cores in the decoder, passing through their transmit apertures for the purpose of performing the priming function of these cores and then is grounded. A prime-drive current source 102 has one output terminal grounded and the other output terminal connected to a winding 101, which is thereafter inductively coupled to all the transfer-control cores 54, 58, 64, 66, 72, 74, to restore them to their clear state. Winding 101, after passing through all the transfer-control cores, is connected to the common junction of windings 94 and 98, and thus back to prime winding 100 again. Accordingly, when the prime-drive source provides an output current, it flows through prime windings 100, acting to prime-set the one of the cores in its unprimed set state. Thereafter, the current flows through the winding 101 back to the prime-drive source, serving to drive to the clear state any of the transfer-control cores which may be in their set state.

A first transfer-control winding 104 is inductively coupled to the cores 54, 72, and 64, passing through their apertures. The transfer-control winding 104 has current applied thereto by a "zero" current drive source 106, which, when actuated, applies a magnetomotive drive to the cores to which the winding 104 is inductively coupled for maintaining those cores in their clear state of magnetic remanence. A second transfer-control winding 108 is inductively coupled to the cores 58, 74, and 66, passing through their apertures. The transfer-control winding 108 has current applied thereto from a "one" current drive source 110, which, when activated, applies sufficient current to the winding 108 to maintain the cores 58, 74, and 66 in their clear states of magnetic remanence.

The zero-current driver 106 and the one-current driver 110 are driven from a code-pulse source 112, which can comprise any suitable source of binary code signals. The "zero" current driver 106 responds to the "zero" representative signals from the code source, and the "one" current driver 110 responds to the "one" representative signals from the code source. Output from the code-pulse source 112 is also applied to a timing circuit 114. The timing circuit emits signals in response to the successive binary-code-bit signals for alternately energizing the advance-odd driver 92 and then the advance-even driver 96.

The circuitry identified by the rectangles in FIGURE 2 are well known to those skilled in the electronic art, and, accordingly, the details thereof will not be given. For example, the code-pulse source can be a punched paper tape and reader which provides positive voltages for the binary-one signal and negative voltages for the binary-zero signals, and the respective zero-current drive and one-current driver can be amplifier circuits which are biased to respond only to signals of a predetermined polarity. A timing circuit 114 can be a flip-flop circuit which is driven from one to the other of its stable states in response to output from the code-pulse source for alternately energizing the advance-even-driver and advance-odd-driver circuits. The advance-even-driver and advance-odd-driver circuits are circuits for providing current when energized to the drive windings to which they are coupled. The prime-drive source can comprise a pulse source which emits a current pulse between energizations of the advance-even and advance-odd-driver circuits for priming whichever one of the cores in the group is in its unprimed-set state and for driving those of the transfer-control cores which have been driven to their set state back to their clear state. If desired, the prime-drive current source may be a direct-current source. The reason for the connection of the ends of the first and second clear windings to the priming winding so that essentially the same winding serves as a clear winding, as a hold winding and as a prime winding.

To explain the operation of the decoding circuit shown in FIGURE 2, let it be assumed that it is desired to decode the binary number "1—0". As previously indicated, the first operation that occurs is that core 30 is placed in its unprimed set state of magnetic remanence. Thereafter, it is primed by the operation of the prime-drive source 102 and the priming winding 100. The first binary bit out of the code-pulse source 112 is a one, in response to which the one-current driver 110 is enabled to apply a holding current to the transfer-control winding 108 to hold the cores 58, 74, and 66 in their clear states. The timing circuit 114 is also enabled to energize the advance-odd-driver circuit 92, in response to which a current pulse is applied to the first advance or clear winding 94. Current in the winding 94 drives the magnetic core 30 back to its clear state, as a result of which a voltage is induced in the transfer windings 52 and 56.

As a result of the induced voltages in these two transfer windings, a drive is applied to the cores 32, 34 which would be sufficient, in the absence of other circumstances, to drive the cores 32 and 34 to their unprimed-set states. However, the current which flows in the transfer winding 52 drives the core 54 to its unprimed set state of remanence. As a result, there is insufficient magnetomotive force to drive the core 32, and it remains in its clear state. Core 58 is maintained in its clear state by the current in the transfer-control winding 108. As a result, the current flowing in the transfer-control winding 56 is enabled to drive the core 34 to its unprimed-set state. Immediately thereafter, core 34 is primed by current from the prime-drive source 102 and core 54 is returned to its clear state.

The next binary bit received from the code-pulse source 112 is a zero. In response thereto, the zero-current driver 106 applies a current to the winding 104, to maintain the transfer-control cores 54, 72, and 64 in their clear state of remanence. The timing circuit 114 is enabled to energize the advance-even-driver current-pulse source 96, in response to which core 34 is driven from its primed-set to its clear state. This induces voltages in the transfer windings 68 and 70. Since the zero transfer-control winding 104 is energized, the core 72 will be maintained in its clear state, and the core 40 will be driven to its unprimed-set state. The transfer-control core 74, which is not held in its clear state, will effectively absorb most of the flux from the core 34, as a result of which the core 42 is maintained in its clear state. A subsequent prime drive primes core 40 and clears core 74.

When readout is desired, a readout source 116 is energized. This advances the timing circuit 114, which, in turn, causes it to energize the advance-odd-driver circuit 92. In response thereto, the winding 98 has a current pulse applied to it, which causes the core 40 to be driven from its primed-set to its clear state. An output voltage is induced in the output winding 84 and is used by the utilization circuit 86.

From the preceding description, it should be clear how the decoding circuit shown in FIGURE 2 operates. Although the size of the circuit is such as to handle the decoding of only two binary bits in a number, it will be obvious to those skilled in the art how the circuit can be enlarged by adding successive groups of cores, each having twice the number of cores than in a preceding group. Two cores in each group are coupled by transfer windings to the transmit aperture of a single core in a preceding group. Each core in a group is coupled by two transfer windings to two cores in a succeeding group. A transfer-control core is inductively coupled to each transfer winding. By determining successively which one of these transfer-control cores shall be driven to the set state upon the clearing of a core in a group, the decoding operation is effectuated.

Figure 3:
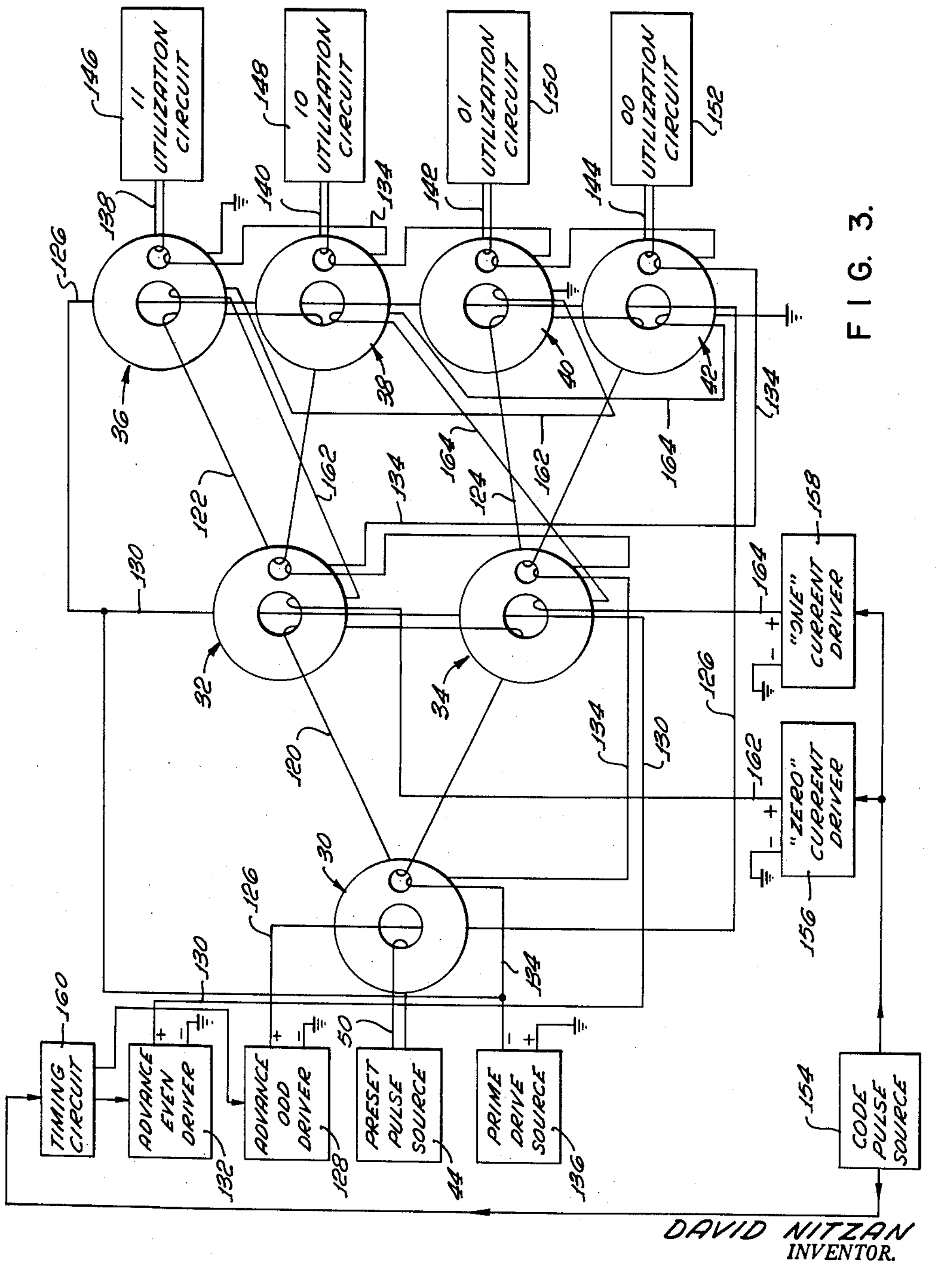
FIGURE 3 is a circuit diagram of another embodiment of this invention.

FIGURE 3 is a circuit diagram of another embodiment of the invention. In this embodiment of the invention, the same "decoding tree" arrangement of the cores 30, 32, 34, 36, 38, 40, and 42, as is employed in FIGURE 2, is used. A preset input winding 50, which is driven from a preset-pulse source 44, drives the core 30 to its unprimed-set state at the outset before a decoding operation. The core 30 is coupled to the two succeeding cores 32, 34 in the next group by means of a transfer winding 120. This transfer winding is wound on the core 30 by passing through its transmit aperture and on the cores 32 and 34 by passing through their main apertures. If desired, two separate transfer windings may be employed, one of which is coupled in the manner of transfer winding 52 in FIGURE 2, between cores 30 and 32, and the other of which is coupled in the manner of transfer winding 56 on cores 30 and 34.

Core 32 is coupled by a transfer winding 122 to cores 36 and 38. The transfer winding is wound on core 32 passing through its transmit aperture and on cores 36 and 38 passing through their main apertures. Core 34 is coupled to cores 40 and 42 by a transfer winding 124. This transfer winding is inductively coupled to core 34 by being wound through its transfer aperture and is inductively coupled to cores 40 and 42 passing through their main apertures. A first clear drive winding 126 is excited by current pulses from an advance-odd-driver current source 128. The winding 126 is inductively coupled to cores 30, 42, 40, 38, 36, by passing through their main apertures. A second clear drive winding 130 receives current pulses from an advance-even-driver current source 132. The second winding 130 is inductively coupled to cores 34 and 32 by passing through their main apertures. Both ends of the first and second clear drive windings, respectively 126 and 130, are connected together and brought to the priming winding 134.

The priming winding is driven from a prime-drive source 136 in the same fashion as was previously described in FIGURE 2. The priming winding 134 is inductively coupled to the transmit apertures of all the cores in the decoding device. Each one of the cores, respectively 36, 38, 40, 42, has an output winding, respectively 138, 140, 142, 144, each of which is inductively coupled to the associated core through its transmit aperture and each of which feeds a utilization circuit, respectively 146, 148, 150, and 152.

The code-pulse source 154 provides the output which drives either the zero-current driver 156 or the one-current driver 158. The code-pulse source 154 also provides an output which drives the timing circuit 160, the output from which, as previously described, alternately actuates the advance-even driver and then the advance-odd driver circuits, respectively 132 and 128. The zero-current driver circuit 156 can apply current to a control winding 162. This control winding is inductively coupled to the cores 32, 36, 40, passing through their main apertures. The one-current driver 158 also can apply pulses of current to a control winding 164. This control winding is inductively coupled to the cores 34, 38, and 42, by passing through their main apertures. The current applied to these control windings is sufficient to maintain the cores to which they are coupled in the clear state of magnetic remanence.

To explain the operation of the embodiment of the invention shown in FIGURE 3 of the drawings, assume that it is desired to decode the binary number "1—0." Assume, further, that the core 30 has been placed in its unprimed-set state of magnetic remanence by a drive received from the preset-pulse source 44 and that the prime-drive source 136 has already driven the core 30 to its primed-set state. The first binary bit from the code-pulse source 154 enables the one-current driver 158 to apply current to the winding 164. Thus, when the advance-odd driver 128 is energized by the timing circuit, it drives core 30 to its clear state, inducing a current into the transfer winding 120. Since the core 34 is being maintained in its clear state by current applied to the winding 164, the current in the transfer winding 120 will drive the core 32 to its unprimed-set state of magnetic remanence. Core 32 immediately thereafter is driven to its primed-set state of magnetic remanence.

The next binary bit received from the code-pulse source is a zero, and the zero-current driver 156 is then enabled to apply current to the winding 162. This holds the core 36 in its clear state. The binary bit from the code-pulse source 154 also enables the timing circuit 160 to energize the advance-even driver circuit 132, whereby the core 32 is driven from its primed-set state to its clear state. As a result, current is induced into the winding 122, which is unable to drive core 36 to its set state because of the holding effect of the excited winding 162. However, the transfer-winding current can drive the core 38 to its unprimed-set state of magnetic remanence. Core 38 is thereafter primed by a drive from the prime-drive source 136. Readout may be achieved by exciting the advance-odd driver winding 126 once more, or by using a supplementary clearing winding which is passed through all the cores in the last group for achieving clearing and/or readout.

It will be appreciated that the purpose of the holding winding is to prevent the transfer from the clear to the unprimed-set state of one of the two cores in a group which is being driven by a core in the preceding group. The arrangement of these control windings is such as to provide a path through the decoding tree to the one of the many output cores which represents the binary input data.

Figure 4:
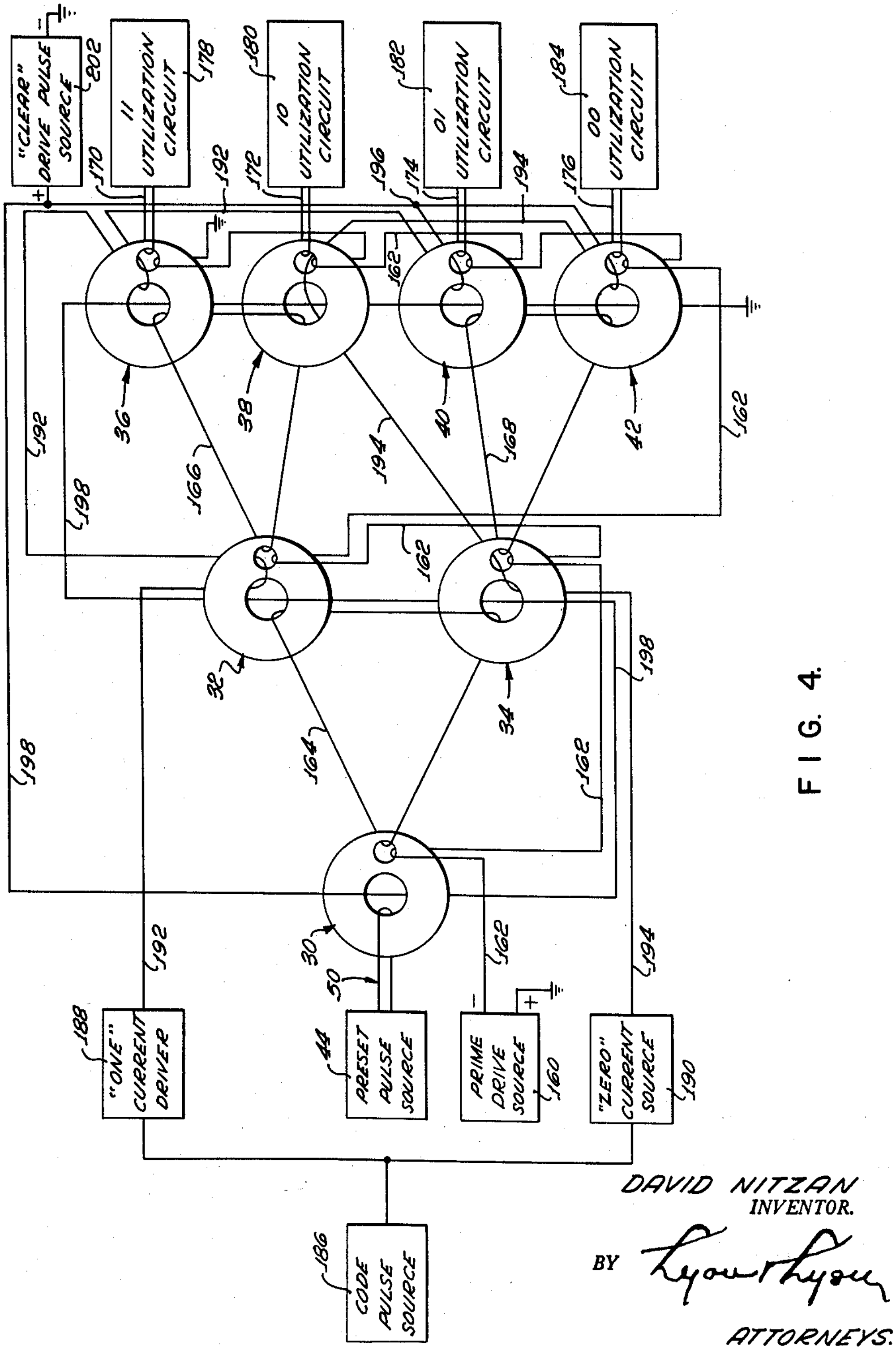
FIGURE 4 is a circuit diagram of still another embodiment of this invention.

FIGURE 4 is a circuit diagram of another embodiment of the invention. The cores 30 through 42 are again arranged in the decoding-tree pattern. Core 30 is placed in its one state prior to the use of the circuit for decoding by a pulse from the preset-pulse source 44 being applied to the input winding 50. The prime-drive source 160 applies current to a priming winding 162, which is coupled to all of the cores in the decoding network by passing through all of their transmit apertures in succession. Core 30 is inductively coupled to the cores 32, 34 by a transfer winding, which passes through the transmit aperture of core 30 and the main apertures of cores 32 and 34. Core 32 is inductively coupled to cores 36 and 38 by the transfer winding 166, which passes through the transmit aperture of core 32 and the main apertures of cores 36 and 38. A transfer winding 168 inductively couples core 34 to cores 40 and 42, passing through the transmit aperture of core 34 and the main apertures of cores 40 and 42. Cores 36, 38, 40, and 42 have output windings 170, 172, 174, 176, respectively coupling these cores to the utilization circuits, respectively 178, 180, 182, 184.

A code-pulse source 186 applies current representative of binary ones and zeros to the one-current driver 188 and the zero-current driver 190. These current drivers opeate in the manner previously described, namely, to become energized by the presence of a one- or the presence of a zero-representative signal. When the one-current driver is energized, it applies current to a control-and-clear winding 192. This control-and-clear winding is inductively coupled to cores 32, 36, and 40. The zero-current driver applies current to a winding 194, which is inductively coupled to cores 34, 38, 42. Both clear and control windings 192 and 194 thereafter are connected together at a junction 196, and then a single winding, which can be considered as a clear winding, passes through the main apertures of all the cores in the decoder in sequence. Thus, the windings 192 and 194 may be considered as the information-control windings, and the succeeding portion 198 may be considered as the clearing winding. It should be noted that the windings 192 and 194 are coupled to the inner leg of material of each one of the cores to which they are coupled. That is, each one of these windings passes through the main aperture and then around the material between the transmit aperture and the main aperture, and then to the succeeding core to wind around the inner leg of material between the main aperture and the transmit aperture again. The control winding and clear winding in each core have the same number of turns but are of opposite polarity.

Assume that it is desired to find an output representative of the binary number "1—0." The core 30 is placed in the unprimed-set state and thereafter in the prime state by a current pulse from the prime-drive source 160 and the prime winding 162. The code-pulse source then provides a binary one digit. In response thereto, the one-current driver applies a pulse of current to the control winding 192 and the clear winding section 198. This results in the core 30 being driven from its primed-set to its clear state. It should be noted that when excitation of a control and a clear winding coupled to a single core occurs, if the core is in the clear state, the magnetomotive forces of these windings, which are substantially equal and opposite, do not of themselves drive the core from the clear state. However, should the core be in the primed-set state, with the presence of clear current only, it will be driven to the clear state. As a result of core 30 being driven to its clear state, a voltage is induced in the transfer winding 164. Since the clear portion of the control winding 192, namely, portion 198, carries current through the core 34 and maintains it in a clear state, core 34 will not be driven in response to the current induced in the transfer winding 164. However, the current in the control-winding portion 192 sets up a magnetomotive force in the core 32, which opposes the magnetomotive force in the winding portion 198. Thus, the core 32 can be driven to its set state, since the two opposing magnetomotive forces cancel each other and enable the core 32 to be a receiver.

The core 32 is driven from its unprimed-set to its primed-set state by the prime-drive source 160. Then the next binary bit, which is zero, is received. This energizes the zero-current driver 190. The winding 194 receives a current pulse, which energizes the clearing portion 198 of this winding. Core 32 is driven from its primed-set to its clear state. Thereby, current is induced in the transfer winding 166. Since the clear drive in the core 38 is canceled effectively by the drive occurring in the winding 194 coupled thereto, core 38 can be driven to its unprimed-set state by the current induced in the winding 166. Core 36 is maintained in the clear state by the current flowing in the clearing winding 198. A readout from the output cores 36, 38, 40, 42 may be achieved by applying a clearing current drive to the clear winding section 198, inductively coupled to all the cores by a signal from a clear-drive pulse source 202. As a result, a voltage is induced in the output winding 172, which is utilized by the utilization circuit 180.

From the above description, the operation of the circuit shown in FIGURE 4 should become clear. The excited control winding cancels the drive of the clear-winding section of the two control windings, whereby a core can become a receiver and can be driven from its clear to its set state. Accordingly, the number of turns of the two opposing windings on a core should be such as to provide cancellation of the drives of these two windings when current flows through both of them.

There has accordingly been described and shown herein a novel, useful, and simple circuit arrangement for selecting one out of many outputs in accordance with binary-coded information applied to an input. Although the embodiments of the invention are shown with a two-binary-bit capability, those skilled in the art will readily appreciate how to build a decoding device of any desired size in accordance with the teachings of this invention, without departing from the spirit and scope of the teachings thereof.

I claim:

1. Apparatus for selecting one of many outputs in response to code signals received from a code-signal source comprising a plurality of magnetic cores each having two states of magnetic remanence, said plurality of cores being arranged in successive groups, transfer-winding means coupling each core in a group to a different two cores in a succeeding group for transferring the state of remanence of said each core to a selected one of said different two cores, means for placing a core in a first group of said successive groups of cores in one of its two states of magnetic remanence, and means for successively selecting responsive to code signals which of two cores in a group to which a core in a preceding group is coupled will be driven to said one state of magnetic remanence including first winding means responsive to the occurrence of code signals from said code-signal source for applying a drive to the cores in a group of cores to drive them to the other of their two states of magnetic remanence, second winding means responsive to the code signals from said code-signal source for enabling a predetermined one of the two cores in a succeeding group to be driven to its one state of magnetic remanence which is coupled to the core in the preceding group being driven from its one to its other state of magnetic remanence, and means for deriving an output from a core in a last of said groups which is driven to its one state of magnetic remanence.

2. Apparatus for selecting one out of many outputs in response to binary code signals received from a binary code signal source comprising a plurality of magnetic cores each having a first and second state of magnetic remanence, said plurality of cores being arranged in successive groups of cores, transfer winding means coupling each core in a group to a different two cores in a succeeding group for transferring the state of remanence of said each core to a selected one of said different two cores, means for placing a core in a first group of said successive core groups in its first state of magnetic remanence, and means for successively selecting responsive to code signals which of two cores in a group to which a core in a preceding group is coupled will be driven to its first state of magnetic remanence, including clear winding means on each core in each group for applying a drive to the second state of magnetic remanence to all the cores in a group responsive to the occurrence of a binary code signal at said source, first current means for providing a drive current responsive to a binary-one-representative signal from said source, second current means for providing a drive current responsive to a binary-zero-representative signal from said source, first control-winding means connected to be driven from said first current means for enabling a predetermined one of each two cores in a group coupled by transfer winding means to a core in a preceding group to be driven to its first state of magnetic remanence when said core in said preceding group is driven from its first to its second state of magnetic remanence, second control-winding means connected to be driven from said second current means for enabling the remaining one of each two cores in a group coupled by transfer winding means to a core in a preceding group to be driven to its first state of magnetic remanence when said core in said preceding group is driven to its second state of magnetic remanence from its first state, and means for deriving an output from a core in a last of said groups which is driven to its first state of magnetic remanence.

3. Apparatus as recited in claim 2 wherein said transfer-winding means coupling each core in a group to a different two cores in a succeeding group comprises two separate transfer-windings coupling each core to each of the different two cores, said first control-winding means includes a first plurality of control cores each having two states of magnetic remanence and a lower drive threshold to be transferred between states of remanence than the cores in said groups of cores, a different one of said control cores being inductively coupled to a different one of each two transfer windings with the same winding sense as that of the core in the succeeding group to which said transfer winding is coupled, a first control winding inductively coupled to said first plurality of control cores for maintaining them in their second states when excited by said first current means, a second plurality of control cores each having two states of magnetic remanence and a lower drive threshold to be transferred between states of remanence than said cores in said groups, a different one of said control cores being inductively coupled to the remaining ones of each two transfer windings with the same winding sense as that of the core in the succeeding group to which said transfer winding is coupled, and a second control winding inductively coupled to said second plurality of control cores for maintaining them in their second states when excited by said second current means.

4. Apparatus as recited in claim 2 wherein said first control-winding means includes a first control winding inductively coupled to each said predetermined ones of each two cores in each group with a sense to hold said cores in their second states when excited by said first current source; wherein said second control-winding means includes a second control winding inductively coupled to each remaining core of each two cores in each group with a sense to hold said remaining cores in their second states when excited by said second current source.

5. Apparatus as recited in claim 2 wherein said first control-winding means includes a first control winding inductively coupled to each said predetermined ones of each two cores in each group with a sense opposite to that of the coupling of said clear-winding means on said cores, wherein said second control-winding means includes a second control winding inductively coupled to each remaining core of each two cores in each group with a sense opposite to that of the coupling of said clear-winding means on said cores, and means connecting together one end of said first and second control windings and said clear-winding means for exciting said clear-winding means with current each time one of said first and second control windings is excited.

6. Apparatus for selecting one out of many outputs in response to binary-code signals received from a binary-code signal source comprising a plurality of toroidal magnetic cores each having a central major aperture and a transmit aperture in the magnetic material of the core adjacent said major aperture, each having a clear, unprimed-set, and primed-set state of magnetic remanance, said plurality of cores being arranged in successive groups of cores, transfer-winding means coupling each core in a group to a different two cores in a succeeding group for transferring the state of remanence of said each core to a selected one of said two different cores, said transfer-winding means passing through the transmit aperture of said each core and through the main aperture of each said two different cores, priming-winding means for driving to their primed-set state cores in their unprimed-set state inductively coupled to all of said plurality of magnetic cores passing through their transmit apertures, and means for successively selecting responsive to code signals which of two cores in a group to which a core in a preceding group is coupled will be driven to its set state of magnetic remanence including means for driving a core in a first of said groups to its unprimed-set state of magnetic remanence, first clear-winding means inductively coupled to all the cores in every other group for driving said cores to their clear states of magnetic remanence, second clear-winding means inductively coupled to all the cores in the remaining groups for driving said cores to their clear states of magnetic remanence, means for successively alternately exciting with current said first and second clear-winding means responsive to the successive occurrence of binary-code signals from said source, means for exciting with current said priming winding for prime-setting any core in its unprimed-set state of magnetic remanence, first current means for providing a drive current responsive to a binary-one-representative signal from said source, second current means for providing a drive current responsive to a binary-zero-representative signal from said source, first control-winding means connected to be driven from said first current means for enabling a predetermined one of each two cores in a group coupled by transfer-winding means to a core in a preceding group to be driven to its unprimed-set state of magnetic remanence when said core in said preceding group is driven from its primed-set state to its clear state of magnetic remanence, second control-winding means connected to be driven from said second current means for enabling the remaining one of each two cores in a group coupled by transfer-winding means to a core in a preceding group to be driven to its unprimed set state of magnetic remanence when said core in said preceding group is driven from its primed-set to its clear state of magnetic remanence, and means for deriving an output from a core in a last of said groups which is driven to its primed-set state of magnetic remanence.

7. Apparatus as recited in claim 6 wherein said transfer-winding means coupling each core in a group to a different two cores in a succeeding group comprises two separate transfer-windings coupling each core to each of the different two cores, said first control-winding means includes a first plurality of control cores each having two states of magnetic remanence and a lower drive threshold to be transferred between states of remanence than the cores in said groups of cores, a different one of said control cores being inductively coupled to a different one of each two transfer windings with the same winding sense as that of the core in the succeeding group to which said transfer winding is coupled, a first control winding inductively coupled to said first plurality of control cores for maintaining them in their second states when excited by said first current means, a second plurality of control cores each having two states of magnetic remanence and a lower drive threshold to be transferred between states of remanance than said cores in said groups, a different one of said control cores being inductively coupled to the remaining ones of each two transfer windings with the same winding sense as that of the core in the succeeding group to which said transfer winding is coupled, and a second control winding inductively coupled to said second plurality of control cores for maintaining them in their second states when excited by said second current means.

8. Apparatus as recited in claim 6 wherein said first control-winding means includes a first control winding inductively coupled to each said predetermined ones of each two cores in each group with a sense to hold said cores in their clear states when excited by said first current source, and wherein said second control-winding means includes a second control winding inductively coupled to each remaining core of each two cores in each group with a sense to hold said remaining cores in their clear states when excited by said second current source.

9. Apparatus as recited in claim 7 wherein said priming winding has two sides connected in series, one of said sides passing through the transfer apertures of said cores for driving to their primed-set state cores in their unprimed-set state, the other of said sides being inductively coupled to all of said control cores for driving them to their clear states.

10. Apparatus for selecting one out of many outputs in response to binary-code signals received from a binary-code signal source comprising a plurality of toroidal magnetic cores each having a central major aperture and a transmit aperture in the magnetic material of the core adjacent said major aperture, each having a clear, unprimed-set, and primed-set state of magnetic remanence, said plurality of cores being arranged in successive groups of cores, transfer-winding means coupling each core in a group to a different two cores in a succeeding group for transferring the state of remanence of said each core to a selected one of said two different cores, said transfer-winding means passing through the transmit aperture of said each core and through the main aperture of each said two different cores, priming-winding means for driving to their prime-set state cores in their unprimed-set state inductively coupled to all of said plurality of magnetic cores passing through their transmit apertures, and means for successively selecting responsive to code signals which of two cores in a group to which a core in a preceding group is coupled will be driven to its set state of magnetic remanence, said means including first current means for providing a drive current responsive to a binary-one-representative signal from said source, second current means for providing a drive current responsive to a binary-zero-representative signal from said source, a clear winding inductively coupled to all said plurality of cores, a first control winding connected to said first current means and inductively coupled to a predetermined one of each two cores in each group which is desired to be driven from a preceding core upon the occurrence of a binary-one-representative signal at said source, said first control winding being wound on a core with an opposite sense to said clear winding and with a number of turns to cancel the effect of a drive by said clear winding, a second control winding connected to said second current means and inductively coupled to the remaining one of each two cores in each group which is desired to be driven from a preceding core upon the occurrence of a binary-zero-representative signal at said source, said second control winding being wound on a core with an opposite sense to said clear winding and with a number of turns to cancel the effect of a drive by said clear winding, means for connecting together an end of said first and second control windings, and means for connecting said end to said clear winding to enable any current flowing through either of said first and second control windings to also flow through said clear winding.

No references cited.